May 27, 1947.   R. F. WARREN, JR   2,421,105
LOCK NUT
Filed March 15, 1944   2 Sheets-Sheet 1
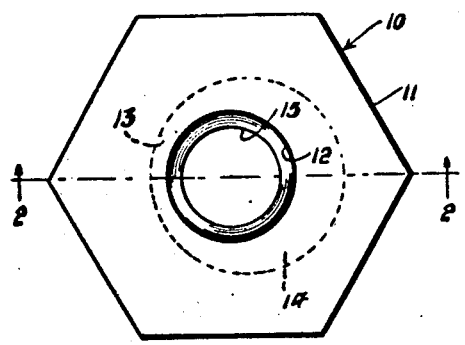
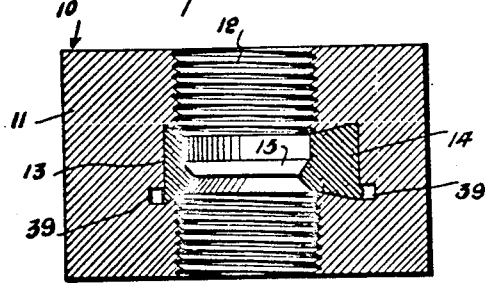
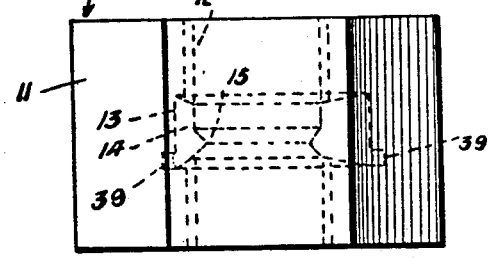
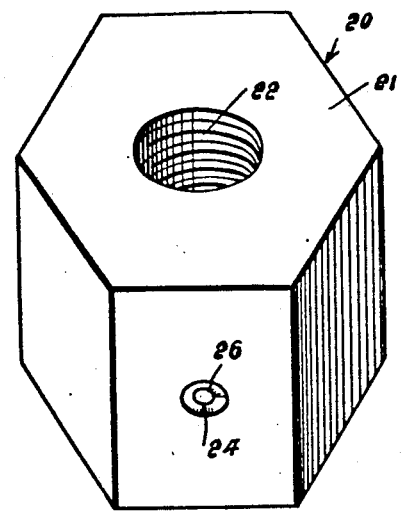
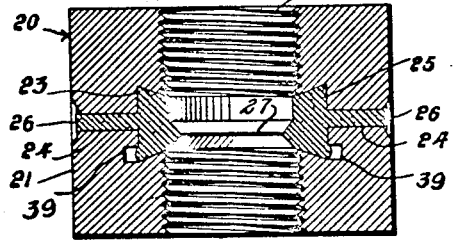
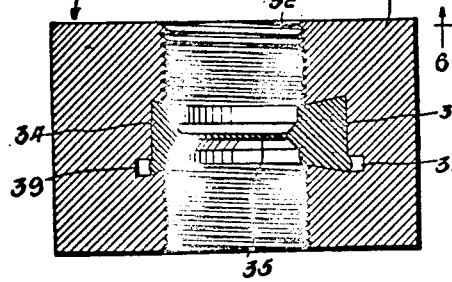
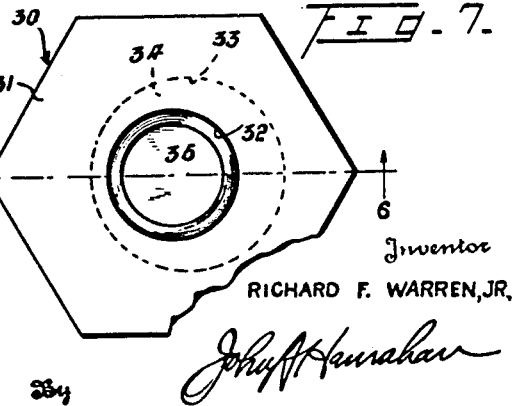
Inventor
RICHARD F. WARREN, JR.
By John F. Hanrahan
Attorney May 27, 1947.   R. F. WARREN, JR   2,421,105
LOCK NUT
Filed March 15, 1944   2 Sheets-Sheet 2

Inventor
RICHARD F. WARREN, JR.
By John J. Hanrahan
Attorney

Patented May 27, 1947

2,421,105

UNITED STATES PATENT OFFICE 2,421,105

LOCK NUT

Richard F. Warren, Jr., Stratford, Conn.

Application March 15, 1944, Serial No. 526,540

7 Claims. (Cl. 151—7)

1

This invention relates to new and useful improvements in lock nuts.

An object of the invention is to provide a lock nut including means whereby a prospective purchaser or user may readily determine whether the lock nut has previously been used.

Another object is to provide a lock nut including a locking insert entirely within the body of the nut.

A further object is to provide a lock nut as stated and in which the insert is so related to the nut that the latter is immovable relative to the insert.

An additional object is to provide a lock nut characterized in that it includes a locking insert of a plastic material.

Another object is to provide improved methods of making lock nuts.

Other objects and advantages will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings:

Fig. 1 is a top plan view of a lock nut made in accordance with the invention;

Fig. 2 is a vertical central sectional view through the lock nut, the view being taken as along the line 2—2 of Fig. 1;

Fig. 3 is a side elevational view of the lock nut of Fig. 1;

Fig. 4 is a perspective view of a modified construction of lock nut;

Fig. 5 is a vertical central sectional view through the nut of Fig. 4;

Fig. 6 is a vertical central sectional view through another modification, the view being taken as along the line 6—6 of Fig. 7;

Fig. 7 is a top plan view of the lock nut of Fig. 6;

2

Figure 11:
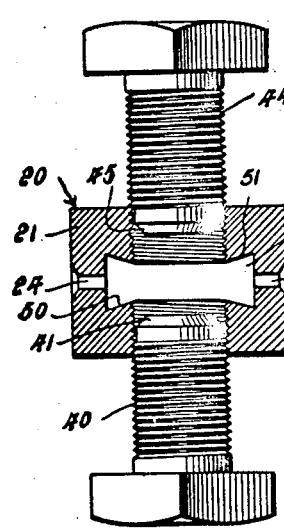
Fig. 11 is a view similar to Fig. 9 but showing a step in the method of making the lock nut of Figs. 4 and 5.
Figure 12:
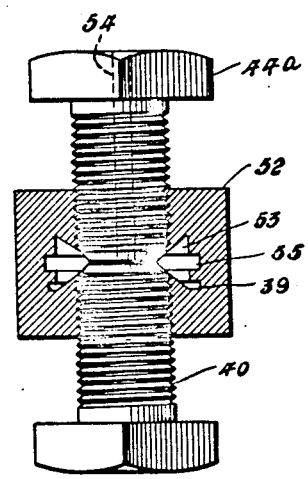

Fig. 12 is a view similar to Fig. 11 but showing another modification.

Referring in detail to the drawings and at first more particularly to Figs. 1 through 3, at 10 is generally indicated a lock nut made in accordance with the invention. Lock nut 10 includes a metal nut body 11 having a threaded passage 12 therethrough for the reception of the shank of a bolt as is usual. Intermediate the ends of the body 11 a recess 13 is cut therein, said recess opening through the threaded wall of the passage 12. Recess 13 is eccentric with respect to the passage 12 whereby the recess is deeper at one side than at the other of said passage. In addition the recess is undercut at its upper and lower sides and is therefore dove-tailed in transverse section as clearly shown in Fig. 2.

In the recess 13 is a locking insert 14 of one or more of the materials to be specified. The insert completely fills the recess and projects somewhat into the passage 12. It preferably projects to such an extent that the inner diameter of the insert is slightly less than the minor diameter of passage 12 but it may be slightly less than the diameter of the major diameter of the passage, i. e., the diameter of the passage as measured across the valley of one of the threads. In addition the insert includes a lip or projecting portion 15 entering into the passage 12.

The insert 14 is preferably of a plastic material placed in position by any desired method or by one of the methods to be hereinafter disclosed. As the insert and the recess 13 are eccentric with respect to the passage 12 it will be clear that the nut body 11 may not be turned relative to the insert about a bolt. Further since the recess is preferably formed after the threads in passage 12 have been cut it will be clear that the threads at one side of the insert are but continuations of those at the other side thereof and that accordingly, there will be no trouble in threading the nut onto a bolt shank.

Lip or annular projection 15 provides a tell-tale device whereby instantly a prospective purchaser or user may ascertain whether the nut has previously been used. When the nut is first used this lip or projection is broken off or compressed into the body of the insert or distributed along the threads of the nut and bolt so that after initial use the lip or projection is no longer present in the nut although the material of the lip may be present.

Figure 8:
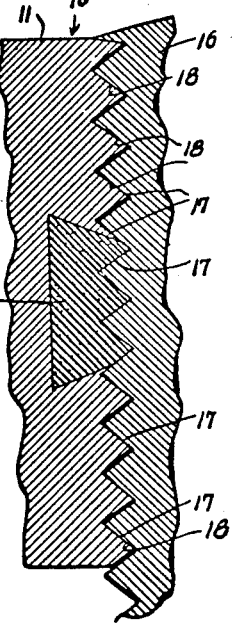
Fig. 8 is a greatly enlarged detail sectional view showing the locking of the nut of Fig. 1 onto a bolt.

Fig. 8 shows (on an exaggerated scale) the nut 10 threaded into place on a bolt 16. It is noted that the insert tends to crowd the nut and bolt apart so the outer surfaces 17 of the nut threads are forced tight against the inner surfaces 18 of the bolt threads. In this way a locking of the nut on the bolt, against casual separation, is accomplished.

Referring now to Figs. 4 and 5 the lock nut there generally designated 20 includes a metal body 21 having a threaded bolt shank receiving passage 22 therethrough. Opening through a wall of this passage is an annular recess 23 eccentric with respect to the passage. Recess 23 is undercut at its upper and lower sides and so, in transverse section, is dove-tailed as shown in Fig. 5. One or more radially extending openings 24 connects the recess 23 with the outer sides of the nut body.

Within the recess is a locking insert 25 including pin-like portions 26 extending into the openings 24. The insert is annular but its inner periphery is in eccentric relation to its outer periphery and the insert is of the internal diameter as above suggested for the insert 14. In addition the insert 25 includes an annular lip or projection 27 of the construction and for the purpose of the lip or projection 15 of Figs. 1, 2 and 3. The nut 20 is used in the same manner as the nut 10 and the insert is held to the body of the nut so that the latter may not be turned relative to the insert both by the eccentric construction described and by the pin-like portions 26 of the insert. The method of making the nut 20 will later be described. The locking action between the nut 20 and a bolt is that described above with reference to Fig. 8.

Referring now to the modification of Figs. 6 and 7 there is shown a lock nut generally designated 30 and comprising a metal nut body 31 having a threaded bolt shank receiving passage 32 therethrough. Within the body 31 and opening through the side walls of passage 32, intermediate the ends thereof, is a recess 33 eccentric with respect to the passage. This recess is undercut at its upper and lower sides so that it is dove-tailed in transverse section as shown in Fig. 6.

Within the recess 33 is a locking insert 34 which, like the inserts 14 and 25, is preferably of a plastic material as will appear. Insert 34 is one integral mass as are the inserts previously described and includes a diaphragm-like portion 35 extending across the passage 32 and closing or blocking the same. Diaphragm 35 is preferably very thin and serves to advise a prospective purchaser or user whether the nut has previously been used.

When the nut 30 is threaded onto a bolt shank the diaphragm 35 is ruptured or broken and the material thereof may be forced out of the nut but is generally partly compressed into the material of the body of the insert 34 while the remainder of the material of the diaphragm is distributed along the threads of the nut and bolt and is caught between the nut and the bolt shank and further serves to lock the nut in place on the bolt. The locking action when the nut 30 is applied to a bolt is that above described and illustrated in Fig. 8.

Any of the nuts 10, 20 or 30 will retain themselves firmly on the shank of a bolt when threaded thereon. In each of the nuts the threads at one side of the locking insert are continuations of those at the other side of the insert so there will be no undue binding of the nut on a bolt and no crossing of threads as the nut is applied to the bolt. The locking inserts shown and described, the material of which will be further described, serve to grip the bolt shank and prevent casual movement of the nut off the bolt. This is true although the bolt may be rapidly and continuously vibrated.

The material of the inserts does not have threads tapped therein prior to the nut being put to use. What happens is that the threads of the bolt onto which the nut may be threaded serve to form threads in the material of the insert. For such reason the inserts are made of a hard material but one that is tough and resilient and therefore not likely to crack. When it is kept in mind that the inner diameter of each insert is such that the inner peripherial edge of each insert is within the bolt shank receiving passage of its nut body it will be apparent that the bolt shank will form threads in the insert and will necessarily somewhat compress the material of the insert.

In addition to providing means whereby the previous use of the nut may be determined visually or by a sense of touch the lips or projections 15 and 27 of the inserts 14 and 25 and the diaphragm or web 35 of insert 33 provide additional material which must be compressed into the bodies of the respective inserts or between the wall of the bolt shank and the receiving passage of the nut body whereby to further secure the nut on the bolt against casual release therefrom.

Each of the nuts herein disclosed may be used repeatedly as a lock nut. One use does not destroy the locking feature although for use in critical locations the first use is the best. Any of the nuts while they will remain in place screwed on a bolt subject to severe vibration may be manually removed from the bolt through the use of a wrench.

Figure 9:
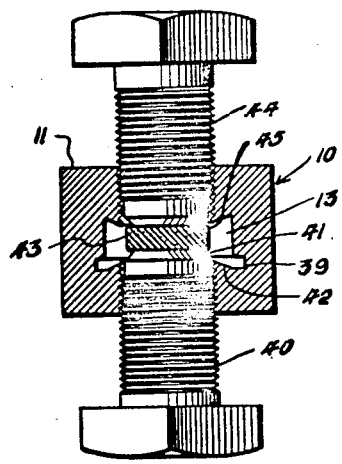
Fig. 9 is a sectional view showing a step in the method of making the lock nut of Figs. 1 through 3.

Fig. 9 shows a step in the method of making either of the lock nuts 10 and 30 although it will first be described as when making the lock nut 10. In the figure the nut is designated 10 and into the lower side of its body a bolt-like means 40 is threaded until the beveled end portion 41 of such means forms a continuation of the lower undercut wall 42 of the recess 13. Thereafter a portion of a suitable plastic material, preferably a preform 43, is disposed on the inner end of the member 40.

Figure 10:
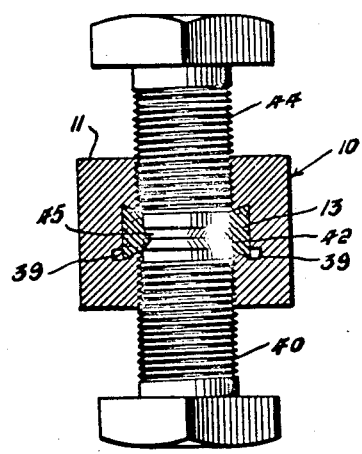
Fig. 10 is a view similar to Fig. 9 but showing the further step in said method.

Then a member 44 is threaded into the upper portion of the passage 12 until the inner end of such member contacts the inner end of member 40. This is as shown in Fig. 10 where it will be noted that the inner ends of the members 40 and 44 are in contact and that the plastic material has been forced laterally into the recess 13 and now comprises the locking insert 14. As the inner end of member 44 has a bevel at 45 it will cooperate with the inner end of member 40 in forming the tell-tale lip or projection 15 previously described.

After the plastic has been forced into the recess 13 to form the locking insert the members 40 and 44 are removed and the plastic may be cured either before or after said members are removed depending upon the type of plastic used. It is to be understood that the method of the invention is not limited to the threaded members 40 and 44, the method broadly residing in the forming of the recess 13 and the forcing of a plastic material laterally into said recess.

The method of Figs. 9 and 10 may be used in the manufacture of the lock nut 30 and in such instance the members 40 and 44 are needed not to force the material by being brought tight against one another. They are brought only approximately into engagement to leave the web or diaphragm 35.

Fig. 11 serves to illustrate the method of manufacture of the lock nut 20. In such figure the nut body 21 is shown with its recess 23 and the radially extending openings 24 connecting the recess with the sides of the nut body. In making nut 20 the member 40 is threaded into the lower side of the nut body until its beveled end surface 41 forms a continuation of the lower wall 50 of the body recess. Then the member 44 is threaded into the upper part of passage 22 until its beveled end 45 forms a continuation or extension of the top wall 51 of said recess. At such times the ends of the members 40 and 44 are together.

Now a suitable plastic material is injected under pressure through the radial openings 24 into the recess 23 filling the same and the V-shaped notches formed by the inner ends of members 40 and 44 whereby the insert 25, pin-like portions 26 and lip 27 are formed. These pin-like extensions 26 assist in preventing turning movement of the nut body relative to the plastic locking insert. When the insert is in place the members 40 and 44 are removed and the insert may be cured before or after such members are removed if the material of the insert is a plastic requiring cure to make it ready for use. Further it is to be understood that the invention is not limited to the members 40 and 44 threaded into the nut body.

In practicing the methods herein disclosed it will be noted that the members 40 and 44 and in fact the entire nut body may be heated during the molding operation when using thermoplastic materials. This is to assist the flow of the materials. However, it is preferred that the heating be accomplished electronically and confined to the plastic employed. This makes the process faster and more convenient since the nut bodies remain unheated and may be better handled. Further it is noted that in the nut bodies 11, 21 and 31 a small groove 39 is provided as an air trap and into which the air in the recess will be driven or compressed during the molding operation. By having an opening through one of the members 40 and 44 the plastic may be injected into the recess of a nut body without having radial openings 24.

This is illustrated in Fig. 12 wherein a metal nut body 52 having a recess 53 for the reception of the locking plastic insert is shown. A plug or member 40 is threaded into position through one end of the body 52 while a member 44a is threaded into position through the other end of said body. Member 44a has an opening 54 therethrough and through which plastic material is injected as will be understood. Radial sockets 55 in the metal nut body 52 are to receive plastic material and thus secure the body 52 and the plastic insert together against relative turning movement.

The locking inserts in each of the lock nuts disclosed are of a material into which the threads of a bolt may form a thread merely by pressing portions of the material out of the way. The bolt threads do not cut away any of the material of the inserts but merely press the threads therein. Preferably the inserts are formed of a material which is water-proof, bacteria and fungus proof whereby not to be subject to decay through biochemical attack, and which has a relatively high heat softening point. Such a material is a hard vinyl chloride containing a minimum of plasticizer.

When the locking insert is wholly within the nut body as herein disclosed it cannot, while the nut is in use on a bolt, be contacted by oil or other matter likely to soften or loosen it. In addition nuts heat up considerably in use in places where they are subjected to rapid vibration and they may be used in hot locations. Therefore if the inserts are of thermoplastic material and should become softened, even to the flow point, the material of the inserts of nuts 10 and 30 cannot escape from its proper place in the metal body nut.

In the nut 20 having the radial holes 24 care should be taken that either these holes are plugged or that the nuts are not used in places or under conditions where the material of the inserts may be heated to the flow point. Otherwise the inserts of these nuts 20 should be of thermosetting material. It is noted that under heat the thermoplastic resins expand and therefore where the lock nuts of the invention have inserts of such material the bolt is gripped tighter as the inserts are heated.

Thermosetting plastics may be used in the various forms of the lock nut of the invention and for some purposes it is advantageous as above indicated in connection with nut 20. It is impervious to moisture, will withstand high heat without deformation or decomposition, has higher compressive strength and is cheaper to use by reason of the fact that it may be loaded with fillers. These materials may be reenforced with fibrous materials, as flock and the like, and will maintain such fibres in place more effectively than many thermoplastic materials.

With the present nut there is a surplus of material in each insert and it is into such surplus that the bolt cuts the threads. When the nut is threaded onto a bolt threads are formed in the insert by displacement of some of the material of the insert and as the material is somewhat elastic it tends to return to its original state and thus constantly grips the bolt while in use and when removed from a nut tends to expand to its original condition so that it will effectively grip a second bolt onto which it may be placed.

The invention is not limited to the use of hard vinyl chloride for the inserts. Other plastics may be used and as a rule plastics have considerable vibration absorbing properties. Generally speaking the inserts comprise organic plastic materials and certain of these materials may be used alone while others may be used only in combination with one or more other materials to make a harder or softer and/or tougher material or mixture. For example, cellulose and its derivatives, while in alpha and beta stage may be used as fillers and to toughen the material.

It is preferred that the material of the inserts be resistant to bacteria and fungus growth whereby the inserts are not subject to decay through biochemical attack, that it have a relatively high heat softening point, that it be water-proof or substantially so, and that it have a certain elasticity and fibre forming characteristics. Various combinations of the herein disclosed materials may be mixed for the purpose of imparting to the mix the desired characteristics. Many of the materials falling within the scope of the present disclosure are chemically incompatible with one another but are mechanically miscible to form a homogeneous mass which may be fabricated to provide the inserts of the nuts of the invention.

Various synthetic resins may be used for the making of the inserts of the invention. That is, I may use (1) phenol-aldehydic resins, (2) amino-aldehydic resins, (3) hydroxy-carboxylic resins, (4) sulphonamide resins, (5) resins from sugar, (6) vinyl resins including resins from vinyl derivatives, (7) indene resins, and (8) lignin plastic substances. I may also use natural and synthetic lastics, cellulose and its derivatives, protein plastic substances and petroleum plastic derivatives. Fillers may be used with various of these materials and may be in the form of powders or fibres. Thus Micarta may be used for my purpose.

Certain of the materials named are too hard and brittle to be used alone for my purpose as they are likely to crack or fracture under vibration or strain. With these materials I mix other softer materials to lend resiliency and toughness to the mass. Other materials herein included are too soft to be used alone and have too low a heat softening point. With such materials I mix harder materials to add materially to their hardness and to raise their heat softening point.

Among the resins under type (1) above, I include resins such as phenol formaldehyde, cresol and cresylic acid, other tar acids and formaldehydes, phenol furfuraldehyde or other tar acids and other aldehydes. Under type (2) is included urea and formaldehyde resins, and aniline resins obtained by condensing aniline and formaldehyde and other anilines or amines and other aldehydes.

Under type (3) I include materials produced by the esterification of polybasic acids and polyhydric alcohols. Such materials are frequently called alkyd resins, this title including adipic acid resins obtained by the condensation of adipic acid and glycerin or by the condensation of glycerin with phthalic anhydride. Type (4) includes the sulphonamide resins developed from para toluensulphonamide. The resins from sugar (type 5) above, are obtained by condensing saccharide with aldehydes and urea.

Type (6) the vinyl resins including resins from vinyl derivatives are best suited for my purpose. These include vinylidene chloride (sold commercially as Saran); vinyl ester; vinyl chloride (having very desirable heat transfer properties); acrylic resins from vinylcarbonic acid ester; vinyl carbonic acid; vinyl benzole or polystyrol; divinyl or butadiene; vinyl ester or vinyl chloride; copolymerized polyvinyl chloride and polyvinyl acetate (known commercially as Vinylite); vinyl acetate; polymers of vinyl halides combined with different percentages of plasticizers (known commercially as Koroseal); the commercial material known as Vistanex (when used with other harder materials) comprising polyiso butylene polymerized with boron trifluoride and also comprising polyiso butadiene having a tacky to rubber-like structure; the commercial products known as Vinyon; Butacite; and Rezyl (comprising respectively a copolymer of polyvinyl chloride and polyvinyl acetate); a reaction product of vinyl acetate resin with butyraldehyde; and resulting from the fact that the introduction of unsaturated resinous esters of the maleate polyester type into a compound of the type (R—CH=CH₂) has the property of curing the latter; vinyl aceto butyrate; vinyl butyrate; the polymers of ester of acrylic acid known commercially as Plexigum; polymers of the ester of methacrylic acids such as the polymethacrylic resin sold as Lucite; isobutyl methacrylic resins; certain plastics obtained by mixing the monomer of styrene with vinylidene chloride and ethylene glycol and maleic acid and copolymerizing the mixture; styrene and in addition thereto the resin known as polystyrene.

Resins of the indene group (type 7) include polyindene and poly-cumaron. Under type (8) I include lignin and its derivatives extracted from paper mill waste waters and other sources. The lignin may be separated into various chemical components of no value to me here but also into colored gums and by various treatments into clear transparent resins useful for my purpose. Lignin is hydrogenated with Raney nickel catalyst, in aqueous solution yielding methanol, propylcychexane, hydroxy propylcychexames, and a colorless resin which may again be separated into an alkali soluble in an alkali insoluble component. I use either of these components in the making of the various inserts of the invention.

Under the heading of natural and synthetic lastics I include balata, rubber, gutta percha and latex either alone or in combination with other plastics. As the synthetic lastics I mention polymerized chloroprene (of the type sold as neoprene); the copolymers including butadiene (of the types sold as Buna and Perbunan); polymethylene polysulphide (of the type sold as (Thiokol); chloronated rubber (of the type sold as Tornesit); rubber hydrochloride (of the type sold as Pliofilm); and isomerized rubber (sold as Plioform) and any latex of these.

Under the heading of cellulose and its derivatives I include cellulose acetate; regenerated cellulose; synthetic cellulose; cellulose xanthate; benzylcellulose; ethylcellulose; cellulose hydrate; cellulose triacetate; cellulose acetobutyrate; cellulose acetopropionate; hydrolized cellulose acetate and others of the cellulose esters and ethers. Most of these materials may be used alone and certain of them for mixing with other materials to provide a tough mixture. Gel cellulose may also be used.

Nitrocellulose compounded with other materials of less flammable nature or of a nature to prevent flammability may be used. Halowax or the like may be used for compounding with the nitrocellulose. Other inflammable plasticizers which may be compounded with nitrocellulose for my purpose are monophenyl phosphate, triphenyl phosphate and di(paratertiary butyl phenyl) mono 15 tertiary butyl 2 zenyl phosphate. The flammable nature of nitrocellulose may be weakened or lessened by mixing with varying proportions of cellulose acetate.

Under the heading of protein plastic substances I include casein plastic products as well as polypentamethylene sebacamide sold as nylon and the group of compounds of which at least one is obtained by the condensation poylmerization from a diamine and dibasic carboxylic acid and of which one is sold under the trade-mark Exton. Collagen plastics are also under this heading of protein plastics. Resins from coffee are believed to fall under this heading.

The petroleum plastic derivatives include those gums or resins obtained by the oxidation or controlled polymerization of certain distillates of petroleum cracking. Those plastics falling under this heading and known as Santoresins are clear, hard neutral products resistant to alkalis, acids, alcohol and water. Petropol is a softer type of the same material. Both may be used for my present purpose but it is preferred that Petropol with some other harder or brittle material, as with one of the condensation resins, to provide an insert having the desired characteristics as to toughness, resiliency, high heat flow point, etc.

While all of the above named plastics may be used alone or in combination with other materials to provide an insert as herein disclosed, there are questions of locations that enter into the problem as to what plastic should be used in any particular instance. Some of the plastics have a higher heat softening point, others are more inert, etc., and so the plastic used in any particular instance should be determined by the conditions under which the lock nut is to be employed. For best results chemical environment should be considered. The metal of the nut body would be determined in the same way. Some of these plastics swell when wet and therefore on drying are likely to fall to pieces. Plastics having such characteristics should not be employed in nuts which are to be reused.

The inserts of the nuts of the invention being made of a material as above disclosed will not dry out while being stored and before use. Further the insert is not generally subject to attack by micro-organisms, etc., and so is not subject to decay through biochemical attack. In addition the material preferably used has a relatively high heat softening point and this is of importance since where the nut in use is subjected to rapid vibration considerable heat is generated.

When the nut of the invention is threaded onto a bolt the threads of the latter are not distorted or mutilated. There is merely a compressing of the material of the inserts whereby the latter grip the bolt shank and casual unthreading of the nut and bolt is prevented.

However, the nut may be removed from the bolt through the use of a wrench and the nut may again be used as a lock nut. It is noted in a nut that has been removed from a bolt after a period of use that the threads remain impressed in the insert and that the material of the insert engaged by the bolt has become fibrous. In this connection attention is directed to the fact that many of the various materials herein mentioned are of fibre forming character.

A material comprising a mixture of thermoplastic and thermosetting materials is useful. In such a mixture the thermosetting material should be in its secondary stage of cure prior to use of the nut. Then when the nut is employed in a hot location or is subjected to rapid vibration while in use the thermosetting portion of the mixture reaches a final stage of cure while in actual use. As the thermosetting portion of the mixture cures or sets up it becomes harder and holds the nut to the bolt. Previously it was noted herein that the thermosetting materials may be used alone, the invention not being limited to such materials only in mixtures with thermoplastic materials. The thermoplastic portion of a mix will, if sufficiently heated, become so soft as to become nearly a lubricant but the nut will be held by the thermosetting portion of such a mix should such conditions as to heat prevail.

Having thus set forth the nature of my invention, what I claim is:

1. In a lock nut, a metal body having a threaded passage therethrough for the reception of the threaded shank of a bolt, said body having a recess opening through a wall of said passage, an insert in said recess and entering said passage to a point beyond the valleys of the threads thereof, said insert comprising a plastic material, and said insert including an integral relatively thin portion extending into said passage to a point beyond the ridges of the threads thereof and adapted to be destroyed on initial threading of said nut onto a bolt.

2. In a lock nut, a metal body having a threaded passage therethrough for the reception of the threaded shank of a bolt, said body having an annular recess opening through the walls of said passage in spaced relation to both ends thereof, an annular insert in and filling said recess and entering said passage to a point beyond the valleys of the threads thereof, said insert of a plastic material, and said insert including a relatively thin annular rib extending into said passage to a point beyond the ridges of the threads thereof and adapted to be destroyed on initial threading of the nut onto a bolt.

3. In a lock nut, a metal body having a threaded passage therethrough for the reception of the threaded shank of a bolt, said body having an annular recess opening through the walls of said passage in spaced relation to both ends thereof, an annular insert in and filling said recess and entering said passage to a point beyond the valleys of the threads thereof, said insert of a plastic material, and said insert including an integral diaphragm-like portion extending across said passage and adapted to be destroyed on initial threading of said nut onto a bolt.

4. In a lock nut, a metal body having a threaded passage therethrough for the reception of the threaded shank of a bolt, said body having an annular recess opening through the walls of said passage in spaced relation to both ends thereof, an annular insert in and filling said recess and entering said passage to a point beyond the valleys of the threads thereof, said insert of a plastic material, radially extending passages communicating said recess with the outer sides of said nut, and integral extensions rigid with said insert and in said radially extending passages to hold the insert and metal body against relative turning movement.

5. The method of making a lock nut comprising forming in a metal nut body having a bolt receiving passage therethrough an annular recess opening through the walls of said passage in spaced relation to both ends thereof, inserting a plug into one end of said passage to a point adjacent said recess, inserting a moldable plastic into said passage onto the inner end of said plug, and then inserting another plug into said passage through the other end thereof and feeding the same inwardly until said plastic has been forced laterally into said recess.

6. The method of making a lock nut comprising forming in a metal nut body having a bolt receiving passage therethrough an annular recess opening through the walls of said passage in spaced relation to both ends thereof, inserting a plug into one end of said passage to a point adjacent said recess, inserting a moldable plastic into said passage onto the inner end of said plug, and then inserting another plug into said passage through the other end thereof and feeding the same inwardly to force said plastic material laterally into said recess but stopping said feeding short of contact between said plugs whereby to leave a diaphragm of said plastic material across said passage.

7. In a lock nut, a metal body having a threaded passage therethrough for the reception of the threaded shank of a bolt, said body having an annular recess opening through the walls of said passage in spaced relation to both ends thereof, an annular insert in an filling said recess and entering into said passage to a point beyond the valleys of the threads thereof, said insert of a plastic material, and said insert including an integral relatively thin portion wedge-shaped in transverse section and extending into said passage to a point beyond the ridges of the threads thereof and adapted to be destroyed on initial threading of the nut onto a bolt.

RICHARD F. WARREN, Jr.

REFERENCES CITED

The following references are of record in the file of this patent:

UNITED STATES PATENTS

| Number | Name | Date |
|---|---|---|
| 2,335,958 | Parker | Dec. 7, 1943 |
| 2,148,959 | Pavlecka | Feb. 28, 1939 |
| 2,321,414 | Parker | June 8, 1943 |
| 2,270,662 | Raney | Jan. 20, 1942 |
| 2,360,531 | Wojtan | Oct. 17, 1944 |
| 2,226,935 | Luce | Dec. 31, 1940 |
| 2,286,336 | Brooke | June 16, 1942 |
| 298,843 | Gissinger | May 20, 1884 |
| 1,297,845 | Hawrylasz | Mar. 18, 1919 |
| 559,782 | Mosley | May 5, 1896 |